April 17, 1956   V. H. FRAY   2,741,784
SCREW OR LIKE NICKING MACHINES
Filed June 14, 1952   5 Sheets-Sheet 1
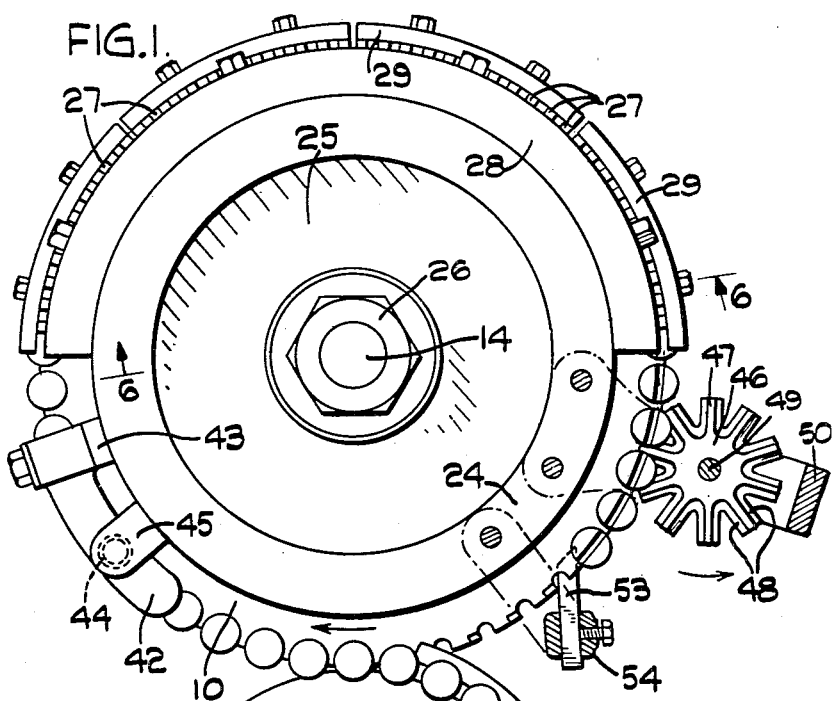
FIG.1.
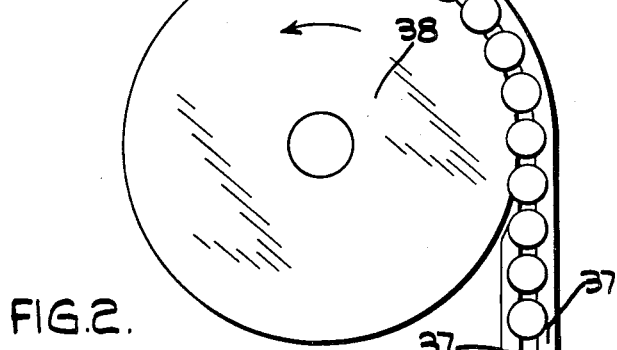
FIG.2.
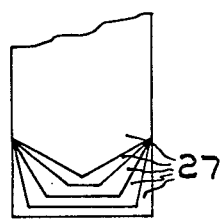
FIG.2ª.
INVENTOR
Victor Hill Fray
BY
Hazeltine, Lake & Co.
AGENTS April 17, 1956     V. H. FRAY     2,741,784
SCREW OR LIKE NICKING MACHINES
Filed June 14, 1952     5 Sheets-Sheet 2
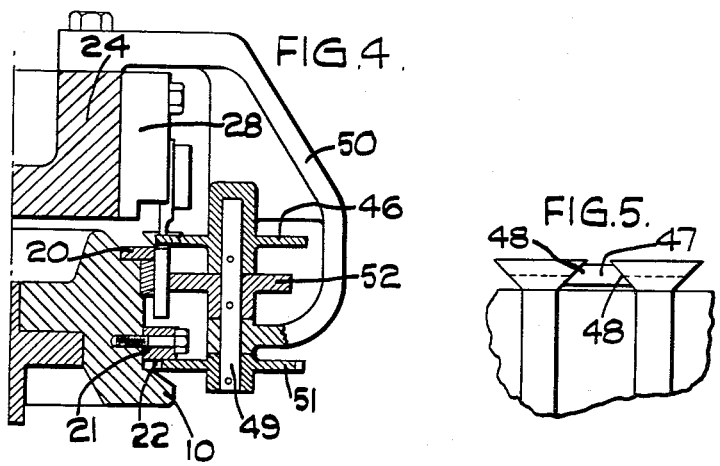
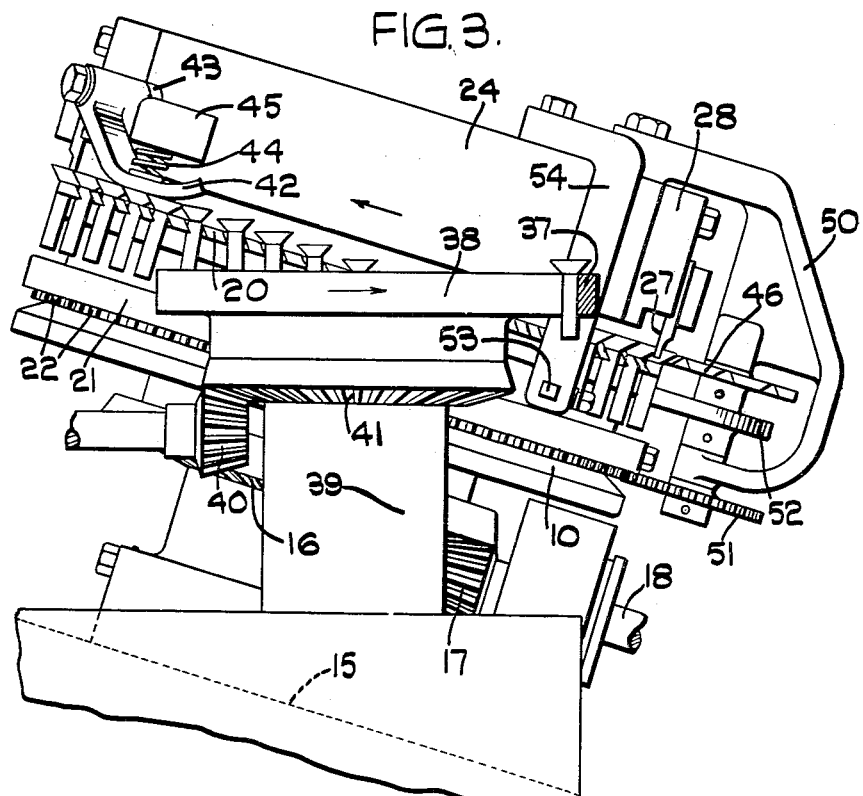
INVENTOR
Victor Hill Fray
BY
Haseltine, Lake & Co.
AGENTS April 17, 1956 V. H. FRAY 2,741,784
SCREW OR LIKE NICKING MACHINES
Filed June 14, 1952 5 Sheets-Sheet 3
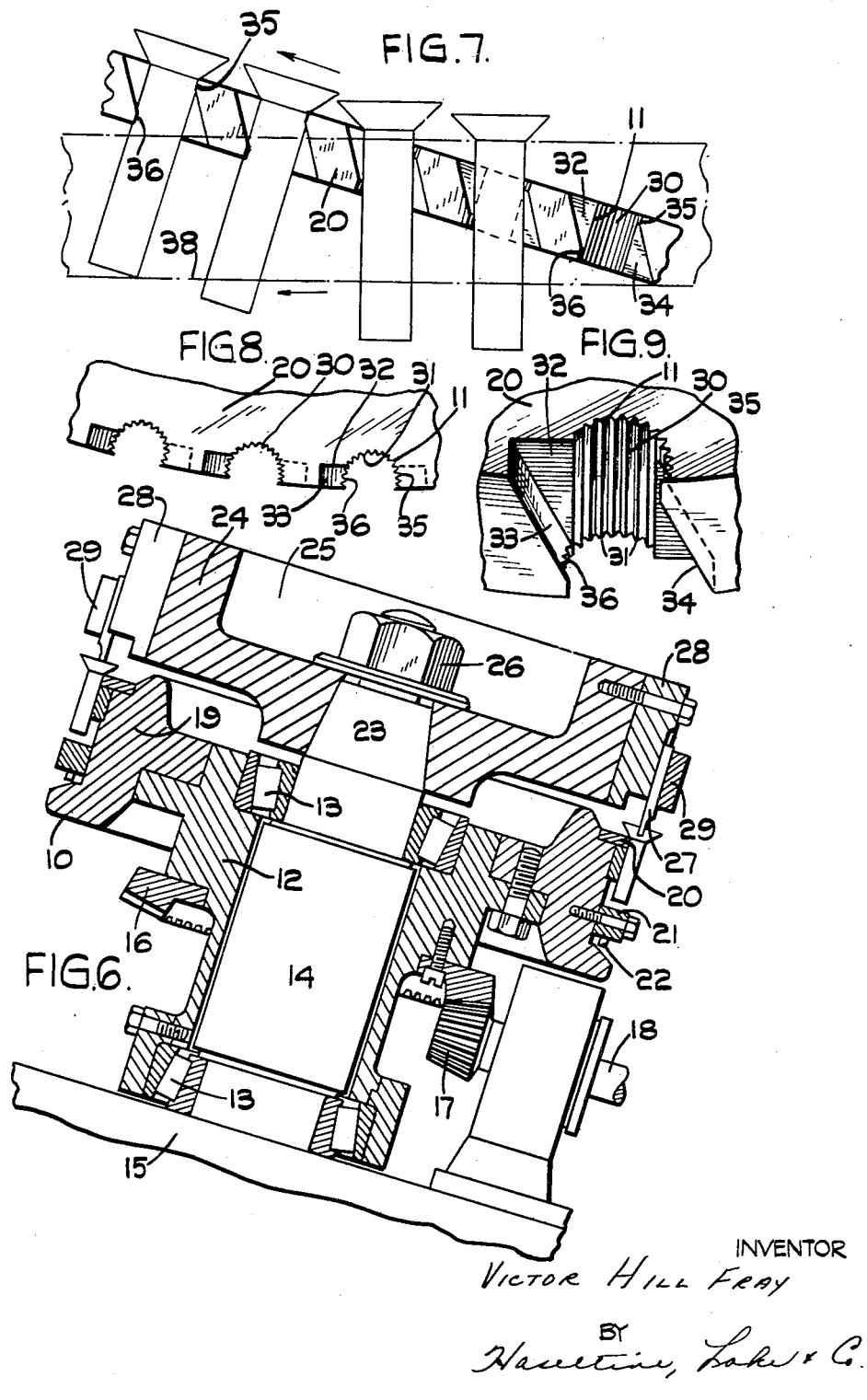
INVENTOR
VICTOR HILL FRAY
BY
Haseltine, Lake & Co.
AGENTS April 17, 1956   V. H. FRAY   2,741,784
SCREW OR LIKE NICKING MACHINES
Filed June 14, 1952   5 Sheets-Sheet 4
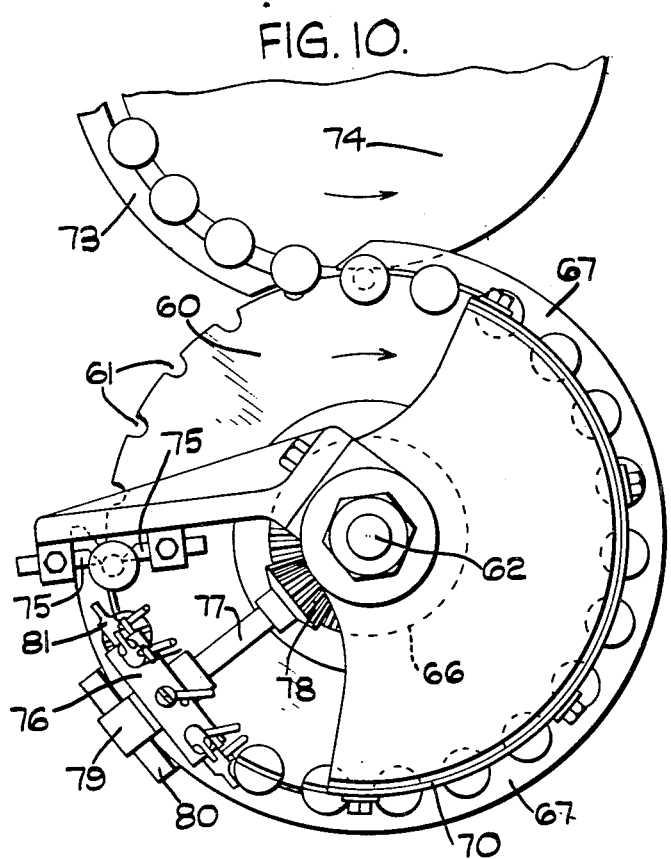
FIG. 10.
FIG. 11.
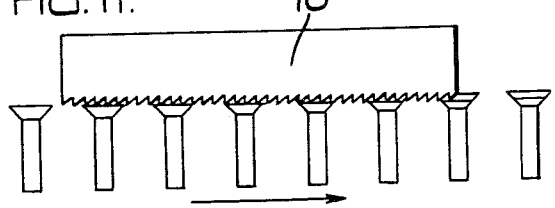
INVENTOR
*Victor Hill Fray*
BY
*Haseltine, Lake & Co.*
AGENTS April 17, 1956 V. H. FRAY 2,741,784
SCREW OR LIKE NICKING MACHINES
Filed June 14, 1952 5 Sheets-Sheet 5
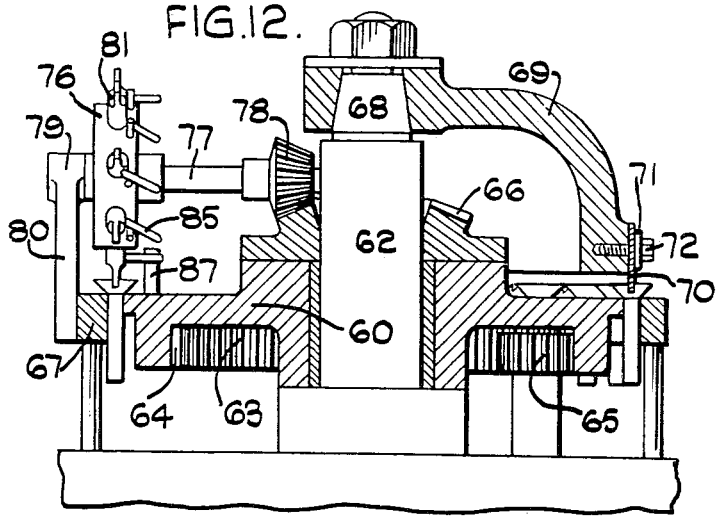
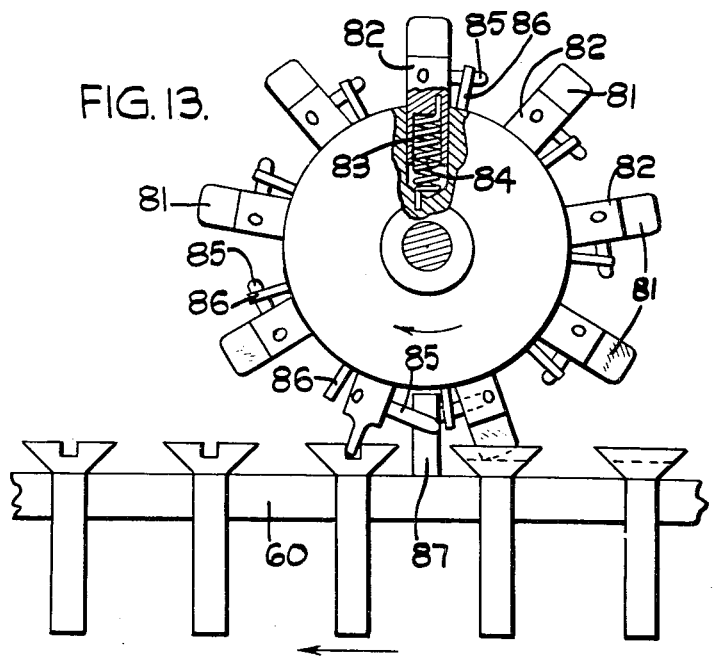
INVENTOR
Victor Hill Fray
BY
Haseltine, Lake & Co.
AGENTS

United States Patent Office 2,741,784
Patented Apr. 17, 1956

2,741,784

SCREW OR LIKE NICKING MACHINES

Victor Hill Fray, Auckland, Auckland, New Zealand

Application June 14, 1952, Serial No. 293,586

Claims priority, application New Zealand June 18, 1951

29 Claims. (Cl. 10—6)

This invention relates to screw and like nicking machines of the kind wherein the blanks are mounted in a carrier drum and are carried past a saw cutting tool so as to cut, for example, the screwdriver slots in the heads of the blanks.

In one known form of nicking machine the blanks are mounted radially in a carrier drum with their heads projecting inwardly the blanks being carried through the path swept by a power driven circular saw which is mounted eccentrically of the axis of the carrier drum. Such a machine suffers from the disadvantages that the saw is not under a uniform load due to the fact that there is a gap between adjacent blanks and to the fact that initially only a small depth of cut is made the slots being cut deeper as the blanks are carried past the saw. This uneven load on the saw is accentuated by the fact that when a blank first contacts the saw only a scratch cut is made thus causing a heavy load on the saw due to the hard skin which is formed as a result of the head forming forging operation.

In view of the uneven loads on the saw it is necessary to mount it in substantial bearings which, due to the nature of the machine, have to be disposed in a confined space and are therefore difficult to maintain.

Furthermore, the saw has to be sharpened from time to time and thus is reduced in diameter each time so that even though the machine allows of some range of adjustment to maintain the desired depth of cut of the slots, the saw, after several sharpenings, eventually becomes too small in diameter for further use in the machine.

The object of the present invention is to provide an improved screw or like nicking machine which is not subject to the above disadvantages.

According to the present invention we provide a rotatable carrier drum having blank receiving slots formed therein, feed means for feeding blanks individually and successively into said slots and a stationary saw member, mounted on the machine, and disposed so as to engage the heads of the blanks and operate thereon during their travel in the carrier drum, means being provided for holding the blanks against rotation in their slots whilst being operated on by the saw.

The carrier drum may be rotatable about a vertical axis, the blank receiving slots being formed axially in the periphery of the drum so that the heads of the blanks rest on the upper face of the drum with the shanks hanging down vertically and a pressure pad being provided around the periphery of the drum for holding the blanks stationary in their slots whilst they are operated on by the saw, this pressure pad engaging the shanks of the blanks.

Alternatively the carrier drum may be rotatable about an axis inclined to the vertical, the blank receiving slots in the periphery of the drum being provided, in this case, with an entry portion into which blanks can be fed with their shanks disposed vertically and a main portion leading out of said entry portion, the main portion being disposed behind the entry portion and being parallel to the axis of the drum the entry portion being provided with one or more projections extending in front of the main portion of the slot so as to prevent a blank being withdrawn from the slot by movement in a direction radial to the drum.

The surface of the main portion of the slot may be ribbed so as to prevent rotation of the blanks therein.

The blanks may be fed to the carrier drum down a chute comprising a pair of spaced rails on which the heads of the blanks rest with the shanks hanging down between the rails a rotatable feed wheel being disposed adjacent the carrier drum for feeding the blanks into the slots in the drum.

The saw may be in the form of a band saw or, alternatively, may be in the form of a number of separate saw teeth elements mounted side by side in spaced relationship. The saw is so arranged that it cuts along a diameter of the heads of the blanks and so that the first cut made on the blanks is very shallow, the depth of cut increasing as the blanks are carried round under the saw.

In order to remove the burrs which are formed at the end of the slots, and which are particularly objectionable with countersunk screws, deburring cutters may be provided so as to operate on the blanks after they have passed the saw.

One form of my invention is illustrated in the accompanying drawings wherein:

Figure 1 is a plan view of one form of screw nicking machine.

Figure 2 is a detail on an enlarged scale showing the blanks passing underneath the saw.

Figure 2a is an enlarged view illustrating a modified form of cutter tooth edge.

Figure 3 is a side elevation of the machine shown in Figure 1.

Figure 4 is a detail in section of the deburring cutters and the drive therefor.

Figure 5 is a detail showing the action of a single deburring cutter blade on adjacent screw blanks.

Figure 6 is a section on line 6—6 of Figure 1.

Figures 7, 8 and 9 are details of the blank receiving slots in the carrier drum.

Figure 10 is a top plan view similar to Figure 1 but showing an alternative form of screw nicking machine.

Figure 11 is a detail showing the blanks passing under the saw.

Figure 12 is a section on line 12—12 of Figure 10 and

Figure 13 is an enlarged side elevation view of the apparatus used for rotating the blanks in their slots after they have passed under the saw and before they reach the deburring cutters.

In the form of the invention shown in Figures 1 to 9 wherein it is applied to a screw nicking machine for forming the screwdriver slots in the heads of blanks the machine comprises a carrier drum 10 which is provided round its periphery with a number of blank receiving slots 11. For the sake of simplicity in describing the carrier drum 10 it may be considered as being mounted for rotation about a vertical axis though as will be described hereinafter and is apparent from Figures 3 and 6 the carrier drum is mounted to rotate about an axis inclined to the vertical.

The carrier drum 10 comprises a main body portion 12 which is mounted in upper and lower bearings 13 for rotation about a central stationary shaft 14 the lower bearings 13 and the lower end of the shaft 14 being supported on a suitable bed plate 15. Bolted to the main body portion 12 is a bevel gear 16 which is in driving engagement with a further bevel 17 which is driven from any suitable source of power by a driving shaft 18. Also secured to the ring portion 19 is a gear ring 21 formed with downwardly projecting gear teeth 22 the purpose of which will be more fully described later. Thus it will be seen that the carrier drum can be rotated about the shaft 14 carrying round with it the carrier ring 20 and the blanks which are disposed in the slots 11 which are formed therein.

The upper end of the central shaft 14 is provided with a cone portion 23 on which is mounted a stationary drum 24 which carries the saw member. As shown in Figure 6 the stationary drum 24 is provided with a central recess 25 into which the threaded end of the shaft 14 projects the drum 24 being secured to the shaft 14 by means of a suitable nut 26 engaging the threaded end of the shaft 14. As readily seen from Figure 2 the saw member comprises a number of separate cutting teeth or saw teeth elements 27 and these saw teeth 27 are mounted in a ring member 28 which is bolted to the stationary drum 24 and which is provided round its periphery with a number of axial grooves in which the saw teeth elements 27 are mounted these elements 27 being retained in position by means of plates 29 which are bolted to the ring 28. As clearly seen from the drawings the carrier drum and the stationary drum are so arranged that the saw teeth are disposed above the centre of the blanks so that as the blanks are carried past the saw a diametrical slot is cut in their heads.

During the head forging operation on the blanks there is a tendency for a hard skin to be formed on the heads of the blanks and in order to reduce the wear on the saw teeth to a minimum the first few saw teeth 27 which the blanks encounter as they are rotated with the carrier drum 10 have their cutting edges of V-shape in cross-section the cross-sectional shape of the saw teeth 27 being progressively changed from V-shape to the final desired shape of the slot, that is to say, channel section, as illustrated in Figure 2a. Furthermore, in order again to reduce the wear on the saw teeth elements 27 and also to minimize the load imposed on any particular tooth, these saw teeth 27 are so arranged in the ring 28 that the depth of cut is gradually increased as the blanks travel round under the saw so that the first teeth only effect a scratch cut on the head of the blanks the final teeth cutting to the full depth of slot required in the heads of the blanks.

It will be appreciated that the blanks must be prevented from rotating in the slots 11 during their travel under the saw so that each successive saw tooth 27 enters into the slot which has previously been cut and furthermore the blanks must of course be prevented from coming out of the slots 11 either as a result of the action of the saw or as a result of centrifugal force it being appreciated that the carrier drum 10 is rotating at a relatively high speed. In order to prevent the blanks from rotating and also from accidently coming out of the slots a special form of slot has been devised and this will now be fully described.

As previously stated the carrier drum 10 is in practice mounted for rotation about an axis which is inclined to the vertical at an angle of the order of 25°. Each blank receiving slot 11 comprises an inner or main portion 30 of substantially semicylindrical shape in plan extending for the full depth of the carrier ring 20 and the walls of this slot 30 being provided with ribs 31 which are arranged parallel to the axis of the drum 10 and the diameter of the inner portion 30 being substantially the same as the shank diameter of the blanks. The front or entry portion 32 of each slot 11 is disposed at an angle to the main portion 30 and this angle is somewhat larger than the angle at which the axis of the carrier drum is inclined to the vertical and may be for example 30° and the width of this entry portion is somewhat greater than the shank diameter of the blanks. As will be seen from the drawings the inclination of this entry portion 32 is in the direction of rotation of the drum 10 and as will be seen from Figure 9 the lower end of the leading face 33 of the entry portion 32 and the upper end of the trailing face 34 are provided with portions which form continuations of the wall of the inner portion 30 of the slot and act as abutments for opposite sides of the blank. Since these portions are continuations of the inner portion 30 each slot is provided at the top of its trailing side with an abutment surface or extension 35 and at the bottom of its leading side with an abutment surface or extension 36 which extensions 35 and 36 are disposed in front of the geometric axis of the inner portion 30 so that if for example a blank was slid into the main portion 30 from above and was of the same diameter as this portion 30 it could not be removed from the slot by a radial movement towards the front of the slot due to the overhanging or projecting portions of the extensions 35 and 36.

The blanks are fed to the machine down a normal feed chute which comprises a pair of spaced rails 37 the heads of the blanks resting on the upper surface of these rails and the shanks of the blanks hanging down between the rails. Adjacent the carrier drum 10 the one rail 37 terminates and is replaced by a rotatable feed drum 38 which is mounted on a shaft 39 and driven from a suitable source of power by a pair of bevels 40 and 41 the feed drum 38 being rotated in the opposite direction to, and at a faster speed than, the carrier drum 10. This feed drum 38 is mounted for rotation about a vertical axis and as will be seen from Figure 1 the travel of this feed drum 38 approaches very closely to the periphery of the carrier drum 10. The blanks are fed down the rails 37 and are then engaged by the periphery of the drum 38 and carried around until a blank registers with one of the slots 11 in the rotating carrier drum 10. As stated above the feed drum 38 is rotating about a vertical axis and as the underside of the heads of the blanks rest on the upper surface of this drum the blanks are disposed with their shanks vertical and will therefore enter the entry portion 32 of a slot 11, each entry portion 32, due to the inclination of the carrier drum 10, being substantially vertical. Thus the blanks are in the position of the two right hand blanks shown in Figure 7. As the carrier drum continues to rotate it approaches somewhat closer to the feed drum 38 than at the point when the blank first entered the slot and due partially to this closer approach of the carrier and feed drums and also to the continued rotation of the carrier drum the blanks are rolled and tilted into the main portion 30 of the slot so that they are in the position of the left hand blanks shown in Figure 7 and are disposed behind the projecting portions 35 and 36. Thus the blanks are prevented from flying out of the slots 11 under the action of centrifugal force.

In order to assist the blanks in taking up their positions in the inner slot 30 and also in order to ensure that the blanks are all pressed fully home in the slots a spring loaded shoe 42 is mounted on the stationary drum 24 in between the feed drum 38 and the commencement of the saw. This shoe 42 is pivotally mounted on a boss 43 secured to the drum 24 and a spring 44 is interposed between the upper face of the shoe 42 and a lug 45 which is also secured to the stationary drum 24. In order to prevent possible damage to the saw elements through a blank having an over-size or deformed head passing under the saw this shoe 42 may be associated with an electric contact so that if the shoe 42 is lifted above its normal position the contact is made so as to energize a solenoid associated with a brake device for stopping the rotation of the carrier drum.

If desired a pressure plate may be provided around the periphery of that portion of the carrier drum between the feed drum 38 and the commencement of the saw so as to prevent the blanks becoming in any way displaced in their slots due to centrifugal force though such a pressure plate should not be necessary.

When the blanks encounter the saw teeth elements 27 the action of the saw teeth on the heads of the blanks tends to tilt the blanks towards the trailing edge of the slots 30 so that the upper portion of that length of the shank of the blank which is in the slot 30 is pressed behind the projecting portion 35 whilst the lower portion of that length of the shank is pressed behind the projecting portion 36. Thus the action of the saw is to hold the blanks more firmly in the slots 30 and furthermore the fact that the wall of each slot 30 is ribbed will make the shanks bite against this wall thus preventing any relative rotation between the blanks and their slots.

As clearly seen from Figure 1 the saw member extends over approximately 180° of the circumference of the carrier drum and adjacent the exit end of the saw member a deburring cutter 46 is provided. As is well known when a slot is cut a burr is formed at the ends of the slot and this is particularly objectionable with screws having countersunk heads. The deburring cutter shown in the drawings comprises a cutter wheel which is provided with a number of radial cutting teeth 47 each tooth being provided on both sides with a cutting edge or blade 48. The cutting wheel is keyed to a central shaft 49 which is rotatably mounted in a bracket member 50 which is secured to the fixed drum 24. Keyed to the lower end of this shaft 49 is a gear wheel 51 which gear wheel 51 is in mesh with the downwardly projecting gear teeth 22 formed on the ring 21 which is bolted to the carrier drum. Thus as the carrier drum 10 rotates the gear wheel 51 is driven thus rotating the shaft 49 and the cutters 47. Also mounted on the shaft 49 for rotation therewith is a pressure wheel 52, this wheel 52 being mounted between the cutter teeth 47 and the gear wheel 51 and frictionally engaging the shanks of the blanks in the carrier drum 10. As seen in Figure 1 each cutting tooth 47 engages successively between adjacent blanks so that the cutting blades 48 remove the burr on the trailing edge of one blank and on the leading edge of the next successive blank. Such an arrangement tends to cause the two blanks which are being acted upon by the cutter to rotate in the slots 11 but such rotation is resisted by the engagement of the pressure wheel 52 with the shanks of the blanks. If desired, however, the deburring cutter 46 may be so arranged that instead of both blades of one tooth engaging two adjacent blanks the adjacent blades of two successive teeth may engage both sides of a single blank at the same time. With such an arrangement it will be appreciated that any tendency of the blanks to rotate in its slot under the influence of the cutters is eliminated.

As previously stated a blank can not be withdrawn from a slot 30 by means of a radial movement and in order to eject the blanks from the carrier drum an ejector or plough member 53 is provided, this ejector 53 being mounted in a bracket arm 54 which again is secured to the stationary drum 24. As clearly seen from Figures 1 and 3 this ejector 53 can be adjusted towards and away from the carrier drum so as to compensate both for any wear which may take place and also for different sized blanks. This ejector 53 is so located that it engages the lower end of the shanks of the blanks which are hanging down below the slots in the carrier drum and thus tilts the blanks into the original position which they were in when the were being fed into the slots so that the blanks are forced into the outer portion 32 of the slots 30 from which they ejected both under the influence of the ejector 53 and centrifugal force. The blanks are then collected in a suitable hopper from whence they can pass to a threading machine.

Although we have shown a feed drum 38 whose diameter is only somewhat less than the diameter of the carrier drum the feed drum may be of considerably smaller diameter and in this case both feed rails 37 will continue to a point nearer the carrier drum. By using a smaller diameter feed drum a more positive feed can be obtained when the feed drum is inclined to the carrier drum.

In the alternative form of machine shown in Figures 10 to 13 there is again provided a carrier drum 60 which is provided around its periphery with axially disposed blank receiving slots 61. As seen in Figure 12 this carrier drum 60 is mounted for rotation about a vertical fixed shaft 62 and is provided on its underside with an annular recess 63 the outer peripheral wall 64 of which is provided with gear teeth adapted to mesh with a gear wheel 65 which is driven from any suitable source. Secured to the upper face of the carrier drum 60 in any suitable manner is a crown wheel 66 the purpose of which wil be described more fully hereinafter.

Surrounding the periphery of the carrier drum 60 from the point at which blanks enter the slots 61 therein to the point at which they are discharged from the slots is an arcuate pressure pad 67 which retains the blanks in the slots 61 and which furthermore presses the blanks tightly against the wall of the slots 61, which may be ribbed, so as to prevent the blanks from rotating in the slots.

The upper end of the shaft 62 is coned as shown at 68 and mounted on this cone portion and secured thereon by means of a suitable locknut and washer is the saw carrying bracket member 69 which as shown in Figure 10 extends over approximately 180° arc of the carrier drum 60. The actual saw 70, which in this instance is in the form of a band saw is secured to the lower end of this bracket 69 by means of a suitable arcuate clamping plate 71 and bolts 72. This saw 70 is so disposed that it is located over the axis of the blanks as they rest in the slots 61 in the carrier drum so that a diametrical cut may be made in the heads of the blanks the saw approaching progressively closer to the carrier drum from the point at which the blanks first engage the saw to the point at which they leave the saw. Thus the depth of cut is gradually increased as the blanks are carried under the saw and an even load is thus maintained on each tooth of the saw.

The blanks are fed into the slots 61 in the carrier drum by means of a similar feed arrangement to that described above the blanks being fed down a pair of stationary rails 73 (only one of which is shown in the drawings) and are engaged by a rotating feed drum 74 which is rotated in the opposite direction to the carrier drum 60 by any suitable means the feed drum 74 being rotated at a faster speed than the carrier drum. As the blank receiving slots 61 are axially disposed and as the carrier drum and feed drum are both rotating about vertical axes the feed-in is somewhat simplified to that described above and the pressure pad 67 is so arranged that it engages the shanks of the blanks as soon as they have been pressed fully home in the slots 61 by the feed drum 74 and retains them in these slots until they have passed under the saw and passed the deburring cutter which will presently be described.

In order to remove the burrs which are formed at the end of the slots at the heads of the blanks we provide firstly an arrangement for rotating the blanks through 90° so that the slots which are of course initially in line with the saw are disposed radially of the carrier drum so that as the carrier drum rotates the blanks are passed between a pair of fixed deburring cutters 75 the cutting edges of which are so arranged that as the blanks pass between these cutters 75 the burrs are pushed of cut off. In order to rotate the blanks through 90° we provide, in between the exit end of the saw 70 and the deburring cutters 75 a rotating drum 76 which is mounted for rotation about a horizontal axis and is driven by a shaft 77 whose inner end carrier a bevel gear 78 which is in mesh with the crown wheel 66 secured to the carrier drum 60. The outer end of this shaft 77 is mounted in suitable bearings 79 supported by a bracket 80 which is carried by the pressure pad 67. Mounted round the periphery of this drum 76 are a number of screwdriver elements each comprising a blade 81 and a shank portion 82 this shank portion 82 being rotatably mounted in a suitable radial opening formed in the drum 76. As clearly seen from Figure 13 each shank portion 82 is provided on its inner end with an axial opening 83 in which is mounted a coil spring 84 one end of which is anchored to the shank 82 and the other end of which is anchored to the drum 76. In addition each shank portion 82 has projecting therefrom a pin or finger 85 which in the normal at rest position of the blades 81 engages a limiting stop 86 so disposed that with the finger 85 engaging the stop 86 the blades 81 are disposed so that they will engage in the slot formed in the head of a blank as the blank approaches a point immediately below the axis of the drum 76. Thus as clearly seen in Figure 13 as each blank approaches to immediately below the drum 76 the blade 81 of the screwdriver will be entering the slot formed in the head of the blank and as the blade 81 and blank pass below the centre of the drum 76, the projecting finger 85 associated with the blade 81 engages a fixed stop 87 which engagement causes the shank 82 and blade 81 of the screwdriver element to rotate through 90° thus rotating the blank through 90° in its slot 61. This rotation of the blade 81 and its shank 82 takes place against the spring 84 associated therewith and as soon as the continued movement of the blank in the carrier drum and the rotation of the drum 76 causes the blade 81 to leave the slot in the blank the blade 81 and its associated shank 82 are rotated by the action of the spring 84 until the projecting finger 85 again engages its associated stop 86 thus restoring the blade 81 to a position in which it will be ready to engage in the slot of another blank when the drum 76 has gone through a further revolution. It will be appreciated that the spacing and number of screwdriver elements and the speed of rotation of the drum 76 must correspond with the spacing of the slots 61 in the carrier drum and with the speed of rotation of the carrier drum.

As described above the blanks now pass between the deburring cutters 75 and as the pressure pad 67 terminates immediately after the deburring cutters 75 the blanks will then be ejected from the carrier drum 60 by centrifugal force so that the slots 61 are ready to receive a further blank from the feed drum 74.

It will thus be seen that I have provided a machine wherein the blanks are slotted by means of a stationary saw member so that there is no necessity for the complicated apparatus associated with a rotating saw and furthermore a lighter and more even load is imposed on each section of the saw so that not only can the speed of the carrier drum be increased as compared with the speed of the carrier drum with a rotating saw but the wear on the saw is reduced so that the machine does not have to be stopped so frequently to enable the saw to be re-sharpened and re-set.

What I claim then is:

1. A screw or like nicking machine of the kind described including a frame, a work carrier rotatably supported by said frame and having a plurality of open side slots symmetrically arranged about the axis of rotation of said carrier, said slots extending generally lengthwise of the axis of rotation of said carrier and being adapted to receive the shanks of headed blanks fed thereto at a pickup station, means for rotating said carrier whereby blanks supported thereon are moved in an arcuate path, feed means for feeding blanks individually and successively into said slots with the heads of the blanks positioned adjacent to one end of the slots and with the shanks of the blanks disposed lengthwise of the slots, and stationary tool means comprising a series of cutting teeth a plurality of which progressively approach said carrier in the direction of movement thereof carried by said frame and disposed about said arcuate path in alignment with the ends of said slots adjacent to which the heads of the blanks are positioned whereby the heads of blanks supported in said carrier are operated upon by the tool means during their travel in said arcuate path.

2. A screw or like nicking machine of the kind described including a frame, a work carrier rotatably supported by said frame and having a plurality of open side slots symmetrically arranged about the axis of rotation of said carrier, said slots extending generally lengthwise of the axis of rotation of said carrier and being adapted to receive the shanks of headed blanks fed thereto at a pickup station, means for rotating said carrier whereby blanks supported thereon are moved in an arcuate path, feed means for feeding blanks individually and successively into said slots with the heads of the blanks positioned adjacent to one end of the slots and with the shanks of the blanks disposed lengthwise of the slots, stationary tool means comprising a series of cutting teeth a plurality of which progressively approach said carrier in the direction of movement thereof carried by said frame and disposed about said arcuate path in alignment with the ends of said slots adjacent to which the heads of the blanks are positioned whereby the heads of blanks supported in said carrier are operated upon by the tool means during their travel in said arcuate path, said slots having a shape such that the sides of the shanks of blanks carried therein project therefrom, and pressure pad means substantially coextensive with said tool means comprising a member having a surface juxtajosed the open sides of said slots and spaced from said carrier a distance such that it engages the projecting sides of blanks in said carrier as they are moved therepast and clamps the blanks in said slots.

3. A screw or like nicking machine of the kind described including a frame, a work carrier rotatably supported by said frame and having a plurality of open side slots symmetrically arranged about the axis of rotation of said carrier, said slots extending generally lengthwise of the axis of rotation of said carrier and being adapted to receive the shanks of headed blanks fed thereto at a pickup station, means for rotating said carrier whereby blanks supported thereon are moved in an arcuate path, feed means at said pickup station for feeding blanks individually and successively into said slots with the heads of the blanks positioned adjacent to one end of the slots and with the shanks of the blanks disposed lengthwise of the slots, each of said blank-receiving slots being wider than the width of the shanks of the blanks fed thereto and inclined with respect to its direction of movement in said arcuate path with the end thereof adjacent to which the head of a blank therein is positioned leading the other end thereby providing oppositely facing extensions spaced lengthwise of the slot adapted to engage opposite sides of a blank located therein with the forwardly facing extension engaging the shank of the blank adjacent to the head of the blank, and stationary tool means comprising a series of cutting teeth a plurality of which progressively approach said carrier in the direction of movement thereof carried by said frame and disposed about said arcuate path in alignment with the ends of said slots adjacent to which the heads of the blanks are positioned whereby the heads of blanks supported in said carrier are operated upon by the tool means during their travel in said arcuate path.

4. A screw or like nicking machine of the kind described including a frame, a work carrier rotatably supported by said frame and having a plurality of open side slots symmetrically arranged about the axis of rotation of said carrier, said slots extending generally lengthwise of the axis of rotation of said carrier and being adapted to receive the shanks of headed blanks fed thereto at a pickup station, means for rotating said carrier whereby blanks supported thereon are moved in an arcuate path, feed means for feeding blanks individually and successively into said slots with the heads of the blanks positioned adjacent to one end of the slots and with the shanks of the blanks disposed lengthwise of the slots, and a plurality of stationary individual cutting teeth carried by said frame and disposed about said arcuate path in alignment with the ends of said slots adjacent to which the heads of the blanks are positioned whereby the heads of blanks supported in said carrier are operated upon by the cutting teeth during their travel in said arcuate path, said teeth having a plurality progressively approaching said carrier in the direction of movement thereof.

5. A screw or like nicking machine of the kind described including a frame, a work carrier rotatably supported by said frame and having a plurality of open side slots symmetrically arranged about the axis of rotation of said carrier, said slots extending generally lengthwise of the axis of rotation of said carrier and being adapted to receive the shanks of headed blanks fed thereto at a pickup station, means for rotating said carrier whereby blanks supported thereby are moved in an arcuate path, feed means for feeding blanks individually and successively into said slots with the heads of the blanks positioned adjacent to one end of the slots and with the shanks of the blanks disposed lengthwise of the slots, and stationary tool means having a plurality of cutting teeth progressively approaching said carrier in the direction of movement thereof carried by said frame and disposed about said arcuate path in alignment with the ends of said slots adjacent to which the heads of the blanks are positioned whereby the heads of blanks supported in said carrier are operated upon by the tool means during their travel in said arcuate path.

6. A screw or like nicking machine comprising a carrier member adapted for movement in a forward direction, a plurality of pairs of first and second abutment surfaces adjacent an outer surface of said carrier for holding the shanks of screw blanks and the like, each first abutment surface having portions to engage outer and inner side surfaces of the shank of a blank forwardly of their extreme trailing edge, each second abutment surface being spaced apart from said first abutment surface and having portions to engage outer and inner side surfaces of the shank of the blank rearwardly of the extreme leading edge of the shank, said carrier member being free from obstructions adjacent said abutment surfaces to permit the shank of a blank to be inserted between said first and second abutment surfaces when in a position inclined to their direction of movement with the top portion of the blank leading with respect to the bottom portion and to subsequently permit rotation of the blank about an imaginary axis positioned between the abutment surfaces and generally parallel thereto to bring surfaces of the blank into engagement with said abutment surfaces, means for feeding blanks to said abutment surfaces with the heads of the blanks projecting upwardly of said first abutment surfaces and with the shanks of the blanks inclined to the direction of movement of said carrier member, a spring loaded shoe member disposed adjacent to the first abutment surfaces in the carrier drum and adapted to be engaged by the heads of the blanks and located in the direction of carrier movement from the feed means, said shoe being adapted to rotate the blanks into engagement with the abutment surfaces about said imaginary axis, a plurality of cutting teeth positioned above said first abutment surfaces in the direction of carrier movement from said feed means to successively engage the heads of the blanks, and means spaced in the direction of movement from said cutting teeth to eject the blanks from said carrier.

7. A screw or like nicking machine of the kind described including a frame, a work carrier supported by said frame and having a plurality of open side slots adapted to receive the shanks of headed blanks fed thereto, means for moving said carrier whereby blanks carried thereby are moved in a predetermined path, feed means adjacent to said path for feeding blanks individually and successively into said slots with the heads of the blanks positioned adjacent to one end of the slots and with the shanks of the blanks disposed generally lengthwise of the slots, each of said blank-receiving slots being wider than the width of the shanks of the blanks fed thereto and inclined with respect to its direction of movement in said path with the end thereof adjacent to which the head of a blank therein is positioned leading the other end thereby providing oppositely facing extensions spaced lengthwise of the slot adapted to engage opposite sides of a blank located therein with the forwardly facing extension engaging the shank of the blank adjacent to the head of the blank, tool means carried by said frame and disposed along said path in alignment with the ends of said slots adjacent to which the heads of the blanks are positioned whereby the heads of the blanks supported in said carrier are operated upon by said tool means during their travel in said path, a deburring cutting wheel adjacent to said predetermined path of said blanks mounted for rotation about an axis substantially parallel to the direction of movement of said carrier and spaced in the direction of movement of said carrier from said tool means, and means for rotating said cutter wheel in timed relation to the movement of said carrier, said cutting wheel comprising a plurality of teeth adapted to dovetail and project into the spaces between the heads of blanks in the blank-receiving slots of said carrier as said cutting wheel is rotated in timed relation to the movement of said carrier and having a cutting edge on the leading edge of each of said teeth conforming to the trailing portion of the heads of the blanks whereby said cutting edges are successively forced inwardly across the trailing edge of the heads of successive blanks to remove burrs attached thereto.

8. A screw or like nicking machine of the kind described including a frame, a work carrier supported by said frame and having a plurality of open side slots adapted to receive the shanks of headed blanks fed thereto, means for moving said carrier whereby blanks carried thereby are moved in a predetermined path, feed means adjacent to said path for feeding blanks individually and successively into said slots with the heads of the blanks positioned adjacent to one end of the slots and with the shanks of the blanks disposed generally lengthwise of the slots, each of said blank-receiving slots being wider than the width of the shanks of the blanks fed thereto and inclined with respect to its direction of movement in said path with the end thereof adjacent to which the head of a blank therein is positioned leading the other end thereby providing oppositely facing extensions spaced lengthwise of the slot adapted to engage opposite sides of a blank located therein with the forwardly facing extension engaging the shank of the blank adjacent to the head of the blank, tool means carried by said frame and disposed along said path in alignment with the ends of said slots adjacent to which the heads of the blanks are positioned whereby the heads of the blanks supported in said carrier are operated upon by said tool means during their travel in said path, a deburring cutter wheel adjacent the path of movement of said carrier and mounted for rotation about an axis substantially parallel to the direction of motion of said carrier and spaced in said direction of motion of said carrier from said tool means, means for rotating the movement of said cutter wheel in timed relation to said carrier, and a plurality of teeth on the periphery of said wheel adapted to dovetail and project into the spaces between the heads of blanks in the blank-receiving slots of said carrier as said cutting wheel is rotated in timed relation to the movement of said carrier, said teeth having cutting edges on the leading and trailing edges of each of said teeth conforming in shape to the surfaces of the heads and adapted to engage the surfaces of the heads of adjacent blanks to remove the burrs thereon as the teeth are successively forced inwardly between the blanks as the wheel is rotated in timed relation to the movement of said carrier.

9. A screw or like nicking machine of the kind described including a frame, a work carrier supported by said frame and having a plurality of open side slots adapted to receive the shanks of headed blanks fed thereto, means for moving said carrier whereby blanks carried thereby are moved in a predetermined path, feed means adjacent to said path for feeding blanks individually and successively into said slots with the heads of the blanks positioned adjacent to one end of the slots and with the shanks of the blanks disposed generally lengthwise of the slots, each of said blank-receiving slots being wider than the width of the shanks of the blanks fed thereto and inclined with respect to its direction of movement in said path with the end thereof adjacent to which the head of a blank therein is positioned leading the other end thereby providing oppositely facing extensions spaced lengthwise of the slot adapted to engage opposite sides of a blank located therein with the forwardly facing extension engaging the shank of the blank adjacent to the head of the blank, tool means carried by said frame and disposed along said path in alignment with the ends of said slots adjacent to which the heads of the blanks are positioned whereby the heads of the blanks supported in said carrier are operated upon by said tool means during their travel in said path, means positioned in the direction of movement of said carrier from said tool means for rotating the blanks supported on said carrier approximately 90 degrees, and a cutter blade positioned normal to the path of movement of the blanks on the side to which the trailing edge of the blanks is turned by said last-mentioned means for engaging the side edge of the heads of the blanks and removing burrs thereon.

10. A screw or like nicking machine according to claim 9 comprising a spring loaded shoe member carried by the frame adjacent to the end of the slots in the carrier adapted to be engaged by the heads of the blanks and located intermediate the feed means and the tool means, said shoe being adapted to press the blanks axially into the slots so that their heads are at a common level prior to their being engaged by the tool means, and electric means operatively connected to said shoe member for stopping said carirer when said shoe member is moved beyond a predetermined position due to an oversize or deformed blank.

11. A screw or like nicking machine of the kind described including a frame, a work carrier supported by said frame and having a plurality of open side slots adapted to receive the shanks of headed blanks fed thereto, means for moving said carrier whereby blanks carried thereby are moved in a predetermined path, feed means adjacent to said path for feeding blanks individually and successively into said slots with the heads of the blanks positioned adjacent to one end of the slots and with the shanks of the blanks disposed generally lengthwise of the slots, each of said blank-receiving slots being wider than the width of the shanks of the blanks fed thereto and inclined with respect to its direction of movement in said path with the end thereof adjacent to which the head of a blank therein is positioned leading the other end thereby providing oppositely facing extensions spaced lengthwise of the slot adapted to engage opposite sides of a blank located therein with the forwardly facing extension engaging the shank of the blank adjacent to the head of the blank, tool means carried by said frame and disposed along said path in alignment with the ends of said slots adjacent to which the heads of the blanks are positioned whereby the heads of the blanks supported in said carrier are operated upon by said tool means during their travel in said path, a rotatable drum the circumferential surface of which is positioned over the forwardly facing extensions of said blank-receiving slots in said carrier, a plurality of rotatable screw driver elements projecting radially from the circumferential surface of said drum, said elements having flat blade portions for insertion into the slots formed in the heads of the blanks in said carrier by said tool means, means for rotating said drum in time relation to the movement of said carrier to successively position successive screw driver blades in the screw driver slots in the heads of successive blanks, means for rotating the screw driver elements into a position wherein said blades are aligned to enter said screw driver slots preparatory to being rotated into engagement with the heads of the blanks, means causing approximately a 90-degree rotation of the elements when said blades are in engagement with the heads of the blanks, and a cutter blade positioned in the direction of movement of said carrier, said cutter blade having a cutting edge conforming in shape to the surface of the heads on which burrs are formed by said tool means, said cutter blade being positioned normal to the path of movement of said heads adjacent the side of the heads to which the burrs are turned by said screw driver blades whereby said burrs are removed as they are moved past the cutter blade by the carrier.

12. A screw or like nicking machine of the kind described including a frame, a work carrier supported by said frame and having a plurality of open side slots adapted to receive the shanks of headed blanks fed thereto, means for moving said carrier whereby blanks carried thereby are moved in a predetermined path, feed means adjacent to said path for feeding blanks individually and successively into said slots with the heads of the blanks positioned adjacent to one end of the slots and with the shanks of the blanks disposed generally lengthwise of the slots, each of said blank-receiving slots being wider than the width of the shanks of the blanks fed thereto and inclined with respect to its direction of movement in said path with the end thereof adjacent to which the head of a blank therein is positioned leading the other end thereby providing oppositely facing extensions spaced lengthwise of the slot adapted to engage opposite sides of a blank located therein with the forwardly facing extension engaging the shank of the blank adjacent to the head of the blank, tool means carried by said frame and disposed along said path in alignment with the ends of said slots adjacent to which the heads of the blanks are positioned whereby the heads of the blanks supported in said carrier are operated upon by said tool means during their travel in said path, and an ejector member carried by said frame adjacent to the path of said carrier for engaging the ends of the shanks of blanks extending beyond said rearwardly facing extensions to tilt the blanks out of engagement with said extensions and assist in their removal therefrom.

13. A screw or like nicking machine of the kind described including a frame, a work carrier rotatably supported by said frame and having a plurality of open side slots symmetrically arranged about the axis of rotation of said carrier, said slots extending generally lengthwise of the axis of rotation of said carrier and being adapted to receive the shanks of headed blanks fed thereto at a pickup station, means for rotating said carrier whereby blanks supported thereon are moved in an arcuate path, feed means for feeding blanks individually and successively into said slots with the heads of the blanks positioned adjacent to one end of the slots and with the shanks of the blanks disposed lengthwise of the slots, said carrier having abutment surfaces adjacent to the ends of a plurality of said slots at which the heads of blanks therein are located for engaging opposite radially spaced side portions of the shanks of blanks therein forwardly of their extreme trailing edges and abutment surfaces adjacent to the opposite end of said plurality of slots for engaging opposite radially spaced side portions of the shanks of the blanks therein rearwardly of their extreme leading edges, and stationary tool means comprising a series of cutting teeth a plurality of which progressively approach said carrier in the direction of movement thereof carried by said frame and disposed about said arcuate path in alignment with the ends of said slots adjacent to which the heads of the blanks are positioned whereby the heads of blanks supported in said carrier are operated upon by the tool means during their travel in said arcuate path.

14. A screw or like nicking machine of the kind described including a frame, a work carrier rotatably supported by said frame and having a plurality of open side slots symmetrically arranged about the axis of rotation of said carrier, said slots extending generally lengthwise of the axis of rotation of said carrier and being adapted to receive the shanks of headed blanks fed thereto at a pickup station, means for rotating said carrier whereby blanks supported thereon are moved in an arcuate path, feed means at said pickup station for feeding blanks individually and successively into said slots with the heads of the blanks positioned adjacent to one end of the slots and with the shanks of the blanks disposed lengthwise of the slots, each of said blank-receiving slots being wider than the width of the shanks of the blanks fed thereto and inclined with respect to its direction of movement in said arcuate path with the end thereof adjacent to which the head of a blank therein is positioned leading the other end thereby providing oppositely facing extensions spaced lengthwise of the slot adapted to engage opposite sides of a blank located therein with the forwardly facing extension engaging the shank of the blank adjacent to the head of the blank, and a succession of stationary individual cutting teeth carried by said frame and disposed about said arcuate path in alignment with the ends of said slots adjacent to which the heads of the blanks are positioned, said succession of cutting teeth having a plurality of teeth which progressively approach said carrier in the direction of movement thereof whereby the heads of blanks supported in said carrier are operated upon by the cutting teeth during their travel in said arcuate path.

15. A screw or like nicking machine of the kind described including a frame, a work carrier rotatably supported by said frame and having a plurality of open side slots symmetrically arranged about the axis of rotation of said carrier, said slots extending generally lengthwise of the axis of rotation of said carrier and being adapted to receive the shanks of headed blanks fed thereto at a pickup station, means for rotating said carrier whereby blanks supported thereby are moved in an arcuate path, feed means for feeding blanks individually and successively into said slots with the heads of the blanks positioned adjacent to one end of the slots and with the shanks of the blanks disposed lengthwise of the slots, stationary tool means having a series of cutting teeth a plurality of which progressively approach said carrier in the direction of movement thereof carried by said frame and disposed about said arcuate path in alignment with the ends of said slots adjacent to which the heads of the blanks are positioned whereby the heads of blanks supported in said carrier are operated upon by said cutting teeth during their travel in said arcuate path, said slots having a shape such that the sides of the shanks of blanks carried therein project therefrom, and pressure pad means substantially coextensive with said tool means comprising a member having a surface juxtaposed the open sides of said slots and spaced from said carrier a distance such that it engages the projecting sides of blanks in said carrier as they are moved therepast and clamps the blanks in said slots.

16. A screw or like nicking machine of the kind described including a frame, a work carrier movably supported by said frame and having a plurality of open side slots adapted to receive the shanks of headed blanks, means for moving said carrier whereby blanks carried thereby are moved in a predetermined path, feed means adjacent to said path for feeding blanks individually and successively into said slots with the heads of the blanks positioned adjacent to one end of the slots and with the shanks of the blanks inclined to the direction of movement of said carrier, each of said blank-receiving slots being wider than the width of the shanks of the blanks fed thereto and inclined with respect to its direction of movement in said path with the end thereof adjacent to which the head of a blank therein is positioned leading the other end thereby providing oppositely facing extensions spaced lengthwise of the slot adapted to engage opposite sides of a blank located therein with the forwardly facing extension engaging the shank of the blank adjacent to the head of the blank, and tool means carried by said frame and disposed along said path in alignment with the ends of said slots adjacent to which the heads of the blanks are positioned whereby the heads of the blanks supported in said carrier are operated upon by said tool means during their travel in said path.

17. A screw or like nicking machine of the kind described including a frame, a work carrier supported by said frame and having a pulrality of open side slots adapted to receive the shanks of headed blanks fed thereto at a pickup station, means for moving said carrier whereby blanks carried thereby are moved in a predetermined path, a disk-shaped feed wheel adjacent to said path for feeding blanks individually and successively into said slots with the heads of the blanks positioned adjacent to one end of the slots and with the shanks of the blanks extending in the same direction and inclined to the direction of movement of said carrier adjacent thereto, each of said blank-receiving slots being wider than the width of the shanks of the blanks fed thereto and inclined with respect to its direction of movement in said path with the end thereof adjacent to which the head of a blank therein is positioned leading the other end thereby providing oppositely facing extensions spaced lengthwise of the slot adapted to engage opposite sides of a blank located therein with the forwardly facing extension engaging the shank of the blank adjacent to the head of the blank, and tool means carried by said frame and disposed along said path in alignment with the ends of said slots adjacent to which the heads of the blanks are positioned whereby the heads of the blanks supported in said carrier are operated upon by said tool means during their travel in said path.

18. A screw or like nicking machine according to claim 17 wherein the tool means comprises a plurality of cutting teeth elements the first of which engaged by the blanks have their cutting edge of V shape cross-section the cross-section of the cutting edge of the remaining saw teeth elements progressively changing to the cross-sectional shape of the required slot in the heads of the blanks.

19. A screw or like nicking machine of the kind described including a frame, a work carrier rotatably supported by said frame and having a plurality of open side slots symmetrically arranged about the axis of rotation of said carrier and adapted to receive the shanks of headed blanks fed thereto, means for rotating said carrier whereby blanks carried thereby are moved in an arcuate path, feed means for feeding blanks individually and successively into said slots with the heads of the blanks positioned adjacent to one end of the slots and with the shanks of the blanks inclined to said path of movement of said carrier adjacent thereto, each of said blank-receiving slots being wider than the width of the shanks of the blanks fed thereto and inclined with respect to its direction of movement in said arcuate path with the end thereof adjacent to which the head of a blank therein is positioned leading the other end thereby providing oppositely facing extensions spaced lengthwise of the slot adapted to engage opposite sides of a blank located therein with the forwardly facing extension engaging the shank of the blank adjacent to the head of the blank, and tool means carried by said frame and disposed about said arcuate path in alignment with the ends of said slots adjacent to which the heads of the blanks are positioned whereby the heads of the blanks supported in said carrier are operated upon by said tool means during their travel in said arcuate path.

20. A screw or like nicking machine of the kind described including a frame, a work carrier rotatably supported by said frame and having a plurality of pairs of first and second abutment surfaces adjacent to an outer portion of the carrier symmetrically arranged about its axis of rotation and adapted to receive the shanks of headed blanks fed thereto at a pickup station, means for rotating said carrier whereby blanks carried thereby are moved in an arcuate path, each first abutment surface being shaped to engage outer and inner side surfaces of a portion of the shank of a blank forwardly of its extreme trailing edge and each second abutment surface being shaped to engage outer and inner side surfaces of a portion of the shank of the blank which are rearwardly of its extreme leading edge, said work carrier being free from obstructions adjacent said first and second abutment surfaces to permit the shank of a blank to be fed thereto when inclined with respect to its direction of movement in said arcuate path with the end thereof adjacent the first abutment surface leading with respect to its other end, and to subsequently permit rotation of the blank about an imaginary axis positioned between the abutment surfaces and generally parallel thereto to bring the surfaces of the blank into engagement with said abutment surfaces, feed means for feeding blanks individually and successively into a position between said pairs of abutment surfaces with the heads of the blanks positioned adjacent said first abutment surfaces, and tool means carried by said frame and disposed about said arcuate path adjacent to the heads of blanks in said carrier whereby the heads of the blanks supported in said carrier are operated upon by said tool means during their travel in said arcuate path.

21. A screw or like nicking machine of the kind described including a frame, a work carrier rotatably supported by said frame and having a plurality of open side slots symmetrically arranged about the axis of rotation of said carrier, said slots extending generally lengthwise of the axis of rotation of said carrier and being adapted to receive the shanks of headed blanks fed thereto, means for rotating said carrier whereby blanks supported thereby are moved in an arcuate path, feed means for feeding blanks individually and successively into said slots with the heads of the blanks positioned adjacent to one end of the slots and with the shanks of the blanks inclined to said path of movement of said carrier adjacent thereto, each of said blank-receiving slots being wider than the width of the shanks of the blanks fed thereto and inclined with respect to its direction of movement in said arcuate path with the end thereof adjacent to which the head of a blank therein is positioned leading the other end thereby providing oppositely facing extensions spaced lengthwise of the slot adapted to engage opposite sides of a blank located therein with the forwardly facing extension engaging the shank of the blank adjacent to the head of the blank, and tool means carried by said frame in alignment with the ends of said slots adjacent to which the heads of the blanks are positioned whereby the heads of blanks supported in said carrier are operated upon by the tool means during their travel in said arcuate path.

22. A screw or like nicking machine of the kind described including a frame, a work carrier rotatably supported by said frame and having a plurality of open side slots symmetrically arranged about the axis of rotation of said carrier and adapted to receive the shanks of headed blanks fed thereto, means for rotating said carrier whereby blanks carried thereby are moved in an arcuate path, feed means for feeding blanks individually and successively into said slots with the heads of the blanks positioned adjacent to one end of the slots and with the shanks of the blanks inclined to said path adjacent thereto, each of said blank-receiving slots being wider than the width of the shanks of the blanks fed thereto and inclined with respect to its direction of movement in said arcuate path with the end thereof adjacent to which the head of a blank therein is positioned leading the other end thereby providing oppositely facing extensions spaced lengthwise of the slot adapted to engage opposite sides of a blank located therein with the forwardly facing extension engaging the shank of the blank adjacent to the head of the blank, and stationary tool means comprising a series of cutting teeth a plurality of which progressively approach said carrier in the direction of movement thereof carried by said frame and disposed about said arcuate path in alignment with the ends of said slots adjacent to which the heads of the blanks are positioned whereby the heads of the blanks supported in said carrier are operated upon by said tool means during their travel in said arcuate path.

23. A screw or like nicking machine of the kind described including a frame, a work carrier rotatably supported by said frame and having a plurality of pairs of first and second abutment surfaces adjacent to an outer portion of the carrier symmetrically arranged about its axis of rotation and adapted to receive the shanks of headed blanks fed thereto, means for rotating said carrier whereby blanks carried thereby are moved in an arcuate path, each first abutment surface being arcuately shaped to engage outer and inner side surfaces of a portion of the shank of a blank forwardly of its extreme trailing edge and each second abutment surface being arcuately shaped to engage outer and inner side surfaces of a portion of the shank of the blank which are rearwardly of its extreme leading edge, said work carrier being free from obstructions adjacent said first and second abutment surfaces to permit the shank of a blank to be fed thereto when inclined with respect to its direction of movement in said arcuate path with the end thereof adjacent the first abutment leading with respect to its other end and to subsequently permit rotation of the blank about an imaginary axis positioned between the abutment surfaces and generally parallel thereto to bring the surfaces of the blank into engagement with said abutment surfaces, feed means for feeding blanks individually and successively into a position between said pairs of abutment surfaces with the heads of the blanks positioned adjacent said first abutment surfaces, and tool means carried by said frame and disposed about said arcuate path adjacent to the heads of blanks in said carrier whereby the heads of the blanks supported in said carrier are operated upon by said tool means during their travel in said arcuate path.

24. A screw or like nicking machine of the kind decribed including a frame, a work carrier movably supported by said frame and having a plurality of open side slots adapted to receive the shanks of headed blanks fed thereto, means for moving said carrier whereby blanks carried thereby are moved in a predetermined path, feed means for feeding blanks individually and successively into said slots with the heads of the blanks positioned adjacent to one end of the slots and with the shanks of the blanks inclined to said path adjacent thereto, each of said blank-receiving slots being wider than the width of the shanks of the blanks fed thereto and inclined with respect to its direction of movement in said path with the end thereof adjacent to which the head of a blank therein is positioned leading the other end thereby providing oppositely facing extensions spaced lengthwise of the slot adapted to engage opposite sides of a blank located therein with the forwardly facing extension engaging the shank of the blank adjacent to the head of the blank, said feed means comprising a rotatably disk-shaped feed wheel whose outer circumference extends adjacent to said predetermined path of the blanks, said wheel having axially extending blank-receiving slots around its outer circumference and being rotated in timed relation to the movement of said carrier and about an axis disposed in a plane parallel to the path of motion of said blanks but inclined to the direction of motion of said carrier at an angle corresponding to that of the inclined angle of said slots, and tool means carried by said frame and disposed about said predetermined path in alignment with the ends of said slots adjacent to which the heads of the blanks are positioned whereby the heads of the blanks supported in said carrier are operated upon by said tool means during their travel in said path.

25. A screw or like nicking machine of the kind described including a frame, a work carrier rotatably supported by said frame and having a plurality of pairs of first and second abutment surfaces adjacent to an outer portion of the carrier symmetrically arranged about its axis of rotation and adapted to receive the shanks of headed blanks fed thereto, means for rotating said carrier whereby blanks carried thereby are moved in an arcuate path, each first abutment surface being shaped to engage outer and inner side surfaces of a portion of the shank of a blank which are forwardly of its extreme trailing edge and each second abutment surface being shaped to engage outer and inner side surfaces of a portion of the shank of the blank which are rearwardly of the extreme leading edge of the shank, said work carrier being free from obstructions adjacent said first and second abutment surfaces to permit the shank of a blank to be fed thereto when inclined with respect to its direction of movement in said arcuate path with the end thereof adjacent the first abutment leading with respect to its other end and to subsequently permit rotation of the blank about an imaginary axis positioned between the abutment surfaces and generally parallel thereto to bring the surfaces of the blank into engagement with said abutment surfaces, feed means for feeding blanks individually and successively into a position between said pairs of abutment surfaces with the heads of the blanks positioned adjacent said first abutment surfaces, said feed means comprising a rotatably disk-shaped feed wheel whose outer circumference extends adjacent to said arcuate path of the blanks, said wheel having axially extending blank-receiving slots around its outer circumference and being rotated in timed relation to said carrier about an axis inclined to the axis of rotation of the carrier at an angle corresponding to the angle at which the abutment surfaces are adapted to receive the blanks, and tool means carried by said frame and disposed about said arcuate path adjacent to the heads of blanks in said carrier whereby the heads of the blanks supported in said carrier are operated upon by said tool means during their travel in said arcuate path.

26. A screw or like nicking machine of the kind described including a frame, a work carrier rotatably supported by said frame and having a plurality of open side slots symmetrically arranged about the axis of rotation of said carrier, said slots extending generally lengthwise of the axis of rotation of said carrier and being adapted to receive the shanks of headed blanks fed thereto, means for rotating said carrier whereby blanks supported thereby are moved in an arcuate path, feed means for feeding blanks individually and successively into said slots with the heads of the blanks positioned adjacent to one end of the slots and with the shanks of the blanks inclined to said path adjacent thereto, each of said blank-receiving slots being wider than the width of the shanks of the blanks fed thereto and inclined with respect to its direction of movement in said arcuate path with the end thereof adjacent to which the head of a blank therein is positioned leading the other end thereby providing oppositely facing extensions spaced lengthwise of the slot adapted to engage opposite sides of a blank located therein with the forwardly facing extension engaging the shank of the blank adjacent to the head of the blank, said feed means comprising a rotatably disk-shaped feed wheel whose outer circumference extends adjacent to said predetermined path, said wheel having axially extending blank-receiving slots around its outer circumference and being rotated in timed relation to said carrier about an axis disposed in a plane parallel to said path but inclined thereto at an angle corresponding to that of the inclined angle of said slots, and tool means carried by said frame in alignment with the ends of said slots adjacent to which the heads of the blanks are positioned whereby the heads of blanks supported in said carrier are operated upon by the tool means during their travel in said arcuate path.

27. A screw or like nicking machine of the kind described including a frame, a work carrier rotatably supported by said frame and having a plurality of open side slots symmetrically arranged about the axis of rotation of said carrier and adapted to receive the shanks of headed blanks fed thereto at a pickup station, means for rotating said carrier whereby blanks carried thereby are moved in an arcuate path, feed means at said pickup station for feeding blanks individually and successively into said slots with the heads of the blanks positioned adjacent to one end of the slots and with the shanks of the blanks inclined to said path adjacent thereto, each of said blank-receiving slots being wider than the width of the shanks of the blanks fed thereto and inclined with respect to its direction of movement in said arcuate path with the end thereof adjacent to which the head of a blank therein is positioned leading the other end thereby providing oppositely facing extensions spaced lengthwise of the slot adapted to engage opposite sides of a blank located therein with the forwardly facing extension engaging the shank of the blank adjacent to the head of the blank, said feed means comprising a rotatably disk-shaped feed wheel whose outer circumference extends adjacent to said arcuate path, said wheel having axially extending blank-receiving slots around its outer circumference and being rotated in timed relation to said carrier about an axis disposed in a plane parallel to said path but inclined thereto at an angle corresponding to that of the inclined angle of said slots, and stationary tool means comprising a series of cutting teeth a plurality of which progressively approach said carrier in the direction of movement thereof carried by said frame and disposed about said arcuate path in alignment with the ends of said slots adjacent to which the heads of the blanks are positioned whereby the heads of the blanks supported in said carrier are operated upon by said tool means during their travel in said arcuate path.

28. A screw or like nicking machine of the kind described including a frame, a work carrier rotatably supported by said frame and having a plurality of open side slots symmetrically arranged about the axis of rotation of said carrier, said slots extending generally lengthwise of the axis of rotation of said carrier and being adapted to receive the shanks of headed blanks fed thereto, means for rotating said carrier whereby blanks supported thereon are moved in an arcuate path, feed means for feeding blanks individually and successively into said slots with the heads of the blanks positioned adjacent to one end of the slots and with the shanks of the blanks disposed lengthwise of the slots, said feed means comprising a rotatably disk-shaped feed wheel whose outer circumference extends adjacent to said arcuate path, said wheel having axially extending blank-receiving slots around its outer circumference and being rotated in timed relation to said carrier about an axis disposed in a plane parallel to said path but inclined thereto at an angle corresponding to that of the inclined angle of said slots, stationary tool means comprising a series of cutting teeth a plurality of which progressively approach said carrier in the direction of movement thereof carried by said frame and disposed about said arcuate path in alignment with the ends of said slots adjacent to which the heads of the blanks are positioned whereby the heads of blanks supported in said carrier are operated upon by the tool means during their travel in said arcuate path, a deburring cutter wheel adjacent said predetermined path of said blanks mounted for rotation about an axis substantially parallel to the axis of rotation of said carrier and spaced in the direction of movemeent of said carrier from said tool means, and means for rotating said cutter wheel in timed relation to said carrier, said cutter wheel comprising a plurality of cutting teeth adapted to dovetail and project into the spaces between the heads of blanks in the blank-receiving slots of said carrier as said cutting wheel is rotated in timed relation to said carrier and having a cutting edge on the leading edge of each of said teeth conforming to the trailing portion of the heads of the blanks whereby said cutting edges are successively forced inwardly across the trailing edge of the heads of successive blanks to remove burrs attached thereto.

29. A screw or like nicking machine of the kind described including a frame, a work carrier rotatably supported by said frame and having a plurality of open side slots symmetrically arranged about the axis of rotation of said carrier, said slots extending generally lengthwise of the axis of rotation of said carrier and being adapted to receive the shanks of headed blanks fed thereto, means for rotating said carrier whereby blanks supported thereon are moved in an arcuate path, feed means for feeding blanks individually and successively into said slots with the heads of the blanks positioned adjacent to one end of the slots and with the shanks of the blanks disposed lengthwise of the slots, said feed means comprising a rotatably disk-shaped feed wheel whose outer circumference extends adjacent to said arcuate path, said wheel having axially extending blank-receiving slots around its outer circumference and being rotated in timed relation to said carrier about an axis disposed in a plane parallel to said path but inclined thereto at an angle corresponding to that of the inclined angle of said slots, stationary tool means comprising a series of cutting teeth a plurality of which progressively approach said carrier in the direction of movement thereof carried by said frame and disposed about said arcuate path in alignment with the ends of said slots adjacent to which the heads of the blanks are positioned whereby the heads of blanks supported in said carrier are operated upon by the tool means during their travel in said arcuate path, means positioned in the direction of movement of said carrier from said tool means for rotating the blanks supported on said carrier approximately ninety degrees, and a cutter blade positioned normal to the path of movement of blanks on the side to which the trailing edge of the blanks is turned by said last-mentioned means for engaging the side edge of the heads of the blanks and removing burrs thereon.

References Cited in the file of this patent

UNITED STATES PATENTS

| | | |
|---|---|---|
| 101,228 | Clement | Mar. 29, 1870 |
| 314,936 | Harvey et al. | Mar. 31, 1885 |
| 1,153,540 | Carpenter | Sept. 14, 1915 |
| 2,531,240 | Wilcox | Nov. 21, 1950 |
| 2,643,404 | Fray | June 30, 1953 |
| 2,646,726 | Fogg | July 28, 1953 |

FOREIGN PATENTS

| | | |
|---|---|---|
| 274,028 | Switzerland | June 1, 1951 |
| 591,245 | Germany | Jan. 18, 1934 |